United States Patent
Xiao et al.

(10) Patent No.: US 11,852,934 B2
(45) Date of Patent: Dec. 26, 2023

(54) SHORTING BAR, DISPLAY PANEL, AND DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventors: Bangqing Xiao, Shenzhen (CN); Yi Li, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 202 days.

(21) Appl. No.: 17/425,617

(22) PCT Filed: Jun. 3, 2021

(86) PCT No.: PCT/CN2021/098132
§ 371 (c)(1),
(2) Date: Jul. 23, 2021

(87) PCT Pub. No.: WO2022/170703
PCT Pub. Date: Aug. 18, 2022

(65) Prior Publication Data
US 2023/0152642 A1  May 18, 2023

(30) Foreign Application Priority Data

Feb. 10, 2021 (CN) .......................... 202110185321.3

(51) Int. Cl.
*G02F 1/1362* (2006.01)

(52) U.S. Cl.
CPC .. *G02F 1/136254* (2021.01); *G02F 1/136259* (2013.01); *G02F 1/136263* (2021.01); *G02F 1/136286* (2013.01); *G02F 1/136222* (2021.01)

(58) Field of Classification Search
CPC ......... G02F 1/136254; G02F 1/136259; G02F 1/136263; G02F 1/136286; G02F 1/1309
See application file for complete search history.

(56) References Cited

U.S. PATENT DOCUMENTS

| | | | |
|---|---|---|---|
| 10,788,724 B2* | 9/2020 | Brossard | G02F 1/1533 |
| 2003/0117536 A1 | 6/2003 | Jeon | |
| 2015/0144915 A1* | 5/2015 | Lee | G02F 1/136204 257/40 |

FOREIGN PATENT DOCUMENTS

| | | |
|---|---|---|
| CN | 102033373 A | 4/2011 |
| CN | 102566167 A | 7/2012 |

(Continued)

*Primary Examiner* — Dung T Nguyen
(74) *Attorney, Agent, or Firm* — PV IP PC; Wei Te Chung; Zhigang Ma

(57) ABSTRACT

The present disclosure provides a shorting bar, a display panel, and a display device. The shorting bar includes test lines. Each test wire includes: a base substrate; an insulation layer arranged on the base substrate, in which one or more via holes are formed in the insulation layer; one or more metal wires arranged in the insulation layer, in which each of the metal wires are at least partially exposed in one of the via holes; and a conductive layer at least partially disposed in the via holes and covering the exposed metal wires. The conductive layer is a strippable conductive layer.

19 Claims, 3 Drawing Sheets

(56) References Cited

FOREIGN PATENT DOCUMENTS

| | | | |
|---|---|---|---|
| CN | 105810695 | A | 7/2016 |
| CN | 106324934 | A | 1/2017 |
| JP | H03290623 | A | 12/1991 |

* cited by examiner

SHORTING BAR, DISPLAY PANEL, AND DISPLAY DEVICE

RELATED APPLICATIONS

This application is a Notional Phase of PCT Patent Application No. PCT/CN2021/098132 having international filing date of Jun. 3, 2021, which claims the benefit of priority of Chinese Patent Application No. 202110185321.3 filed on Feb. 10, 2021. The contents of the above applications are all incorporated by reference as if fully set forth herein in their entirety.

FIELD OF INVENTION

The present disclosure relates to the technical field of display devices, and specifically to a shorting bar, a display panel, and a display device.

BACKGROUND OF INVENTION

With continuous development of display technology, people have higher and higher requirements for display devices. Development of electronic products is promoted in a trend of a slim-bezel, multi-function, and low power consumption. Especially with the realization of slim-bezel electronic products, a display screen has a higher screen-to-body ratio and a better visual effect under a condition of the same area. Thus, the slim-bezel electronic products are becoming more and more popular.

In a manufacturing process of display panels, such as liquid crystal display panels, to ensure quality of products, defective products after each process are intercepted in time, and there will be a detection stage after each process. Especially after a cell process is performed, a liquid crystal panel display is illuminated to be observed the display effect provided by the liquid crystal. A design of a shorting bar will be used in a process of a cell test, so that data lines of sub-pixels are shorted together, and the panel is checked for color shift, poor wiring, and other issues. After an inspection is completed, the shorting bar is disconnected from the data lines in the panel by laser cutting to form floating wiring.

The shorting bar designed for the slim-bezel type liquid crystal display is usually arranged within an outer lead bonding (OLB) region. For slim-bezel display panel products, in a case of no bezel protection, the shorting bar remaining in the OLB region easily introduces external static electricity into a chip on film (COF), causing electrostatic injury to the COF and reducing ability of anti-electrostatic discharge (ESD) of the display panel.

SUMMARY OF INVENTION

The present disclosure provides a shorting bar, a display panel, and a display device to solve a problem of electrostatic injury caused by test lines.

In the first aspect, the present disclosure provides a shorting bar, which includes a plurality of test lines, wherein each of the test lines includes:
  a base substrate;
  an insulation layer disposed on the base substrate, wherein one or more via holes are formed in the insulation layer;
  one or more metal wires disposed in the insulation layer, wherein each of the metal wires are at least partially exposed in one of the via holes; and
  a conductive layer at least partially disposed in the via holes and covering the exposed metal wires, wherein the conductive layer is a strippable conductive layer.

In the shorting bar described in the present disclosure, a thickness of the conductive layer is ranged from 0.5 to 0.7 µm.

In the shorting bar described in the present disclosure, a size of each of the via holes is ranged from 8 to 30 µm.

In the shorting bar described in the present disclosure, a number of the one or more via holes is a plurality, and the plurality of via holes are disposed in a spaced manner.

In the shorting bar described in the present disclosure, a distance between adjacent two of the plurality of via holes is ranged from 5 to 10 µm, in a length direction of the test lines.

In the shorting bar described in the present disclosure, each of the plurality of via holes is shaped as at least one of a circle, a rectangle, or a triangle.

In the shorting bar described in the present disclosure, the conductive layer is a transparent conductive layer made of indium tin oxide, antimony-doped tin oxide, aluminum-doped zinc oxide, or indium-doped zinc oxide production.

In the shorting bar described in the present disclosure, the one or more via holes include a first hole, the one or more metal wires include a first metal layer, and the insulation layer includes a first insulation layer, wherein
  the first insulation layer is disposed on the base substrate; and
  the first metal layer is disposed in the first insulation layer.

In the shorting bar described in the present disclosure, which further includes:
  a color resist layer disposed above the first metal layer, wherein the first hole is defined in the color resist layer and above the first insulation layer, and the first metal layer is at least partially exposed in the first hole; and
  the conductive layer is disposed on the exposed first metal layer.

In the shorting bar described in the present disclosure, the color resist layer includes a plurality of color resists with different colors.

In the shorting bar described in the present disclosure, the first metal layer is made of one or more metals of molybdenum, chromium, aluminum, or copper.

In the shorting bar described in the present disclosure, the one or more via holes further includes a second hole, the insulation layer includes a second insulation layer, and the shorting bar further includes a second metal layer;
  the second insulation layer is disposed between the first metal layer and the color resist layer;
  the second metal layer is disposed in the second insulation layer;
  the second hole is defined in the color resist layer and above the second insulation layer, and the second metal layer is at least partially exposed in the second hole; and
  the conductive layer covers the color resist layer, and the first metal layer and the second metal layer are connected via the conductive layer.

In the shorting bar described in the present disclosure, the second metal layer is made of one or more metals of molybdenum, chromium, aluminum, or copper.

In the shorting bar described in the present disclosure, material of the base substrate includes one or more of glass, silicon dioxide, polyethylene, polypropylene, polystyrene, polylactic acid, polyethylene terephthalate, polyimide, or polyurethane.

In the shorting bar described in the present disclosure, which further includes:

a test pad connected to the test lines, wherein the test pad includes a plurality of test sub-pads that are disposed in a spaced manner.

In the shorting bar described in the present disclosure, the test sub-pads include a red-pixel-color test pad, a green-pixel-color test pad, a blue-pixel-color test pad, and an upper-plate-common-electrode test pad, and two sides of the test sub-pads are connected to data lines via the test lines.

In a second aspect, the present disclosure also provides a display panel, which includes a shorting bar, wherein the shorting bar includes:

a base substrate;

an insulation layer disposed on the base substrate, wherein one or more via holes are formed in the insulation layer;

one or more metal wires disposed in the insulation layer, wherein each of the metal wires are at least partially exposed in one of the via holes; and a conductive layer at least partially disposed in the via holes and covering the exposed metal wires, wherein the conductive layer is a strippable conductive layer.

In the display panel described in the present disclosure, a thickness of the conductive layer is ranged from 0.5 to 0.7 µm.

In the display panel described in the present disclosure, a size of each of the via holes is ranged from 8 to 30 µm.

In a third aspect, the present application also provides a display device, which includes the display panel as mentioned above.

The beneficial effects of the present disclosure are: by providing one or more via holes in the test lines, each of the metal wires of the test lines are exposed in one of the via holes, and an erasable conductive layer is provided on the metal wires. It can prevent the metal wires of the test lines from being corroded by water vapor before a process of a cell test. Because the conductive layer is the erasable conductive layer, after the cell test is completed, the conductive layer can be directly erased to make that the metal wires of the test lines are exposed in the air through the via holes, so that the metal wires are oxidized and corroded in the air, thereby increasing resistance of the metal wires, and causing static electricity to be released directly on the metal wires of the test lines to prevent static electricity injury, which helps to improve yield of the product.

BRIEF DESCRIPTION OF DRAWINGS

The technical solutions and other beneficial effects of the present disclosure will be made obvious by describing the specific implementation manners of the present disclosure in detail below in conjunction with the accompanying drawings.

DETAILED DESCRIPTION OF PREFERRED EMBODIMENTS

Figure 1:
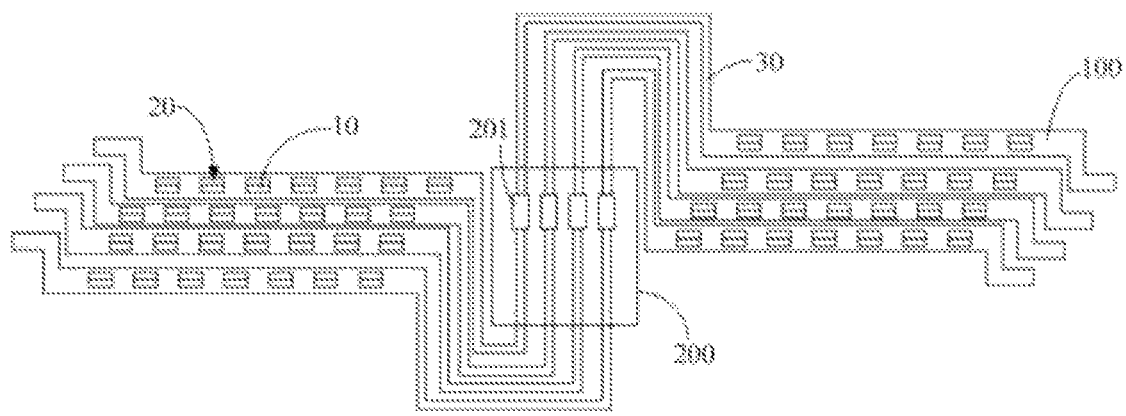
FIG. 1 is a schematic diagram of a structure of a shorting bar provided by an embodiment of the present disclosure.

The technical solutions in embodiments of the present disclosure will be clearly and completely described below in conjunction with the drawings in the embodiments of the present disclosure. Obviously, the described embodiments are only a part of the embodiments of the present disclosure, rather than all of the embodiments. Based on the embodiments in the present disclosure, all of other embodiments obtained by those ordinarily skilled in the art without creative work should fall within a protection scope of the present disclosure.

In the description of the present disclosure, it should be understood that orientation and position relationship instructed by the terms, such as "center," "longitudinal," "transverse," "length," "width," "thickness," "upper," "lower," "front," "back," "left," "right," "vertical," "horizontal," "top," "bottom," "inner," "outer," "clockwise," and "counterclockwise," is based on orientation or position relationship shown in the drawings, and is merely for the convenience of describing the present disclosure and simplifying the description, rather than indicating or implying that indicated devices or elements must have a specific orientation and be constructed and operated in a specific orientation. Therefore, it cannot be understood as a restriction on the present disclosure. In addition, the terms "first" and "second" are only used for descriptive purposes and cannot be understood as indicating or implying relative importance or implicitly indicating the number of indicated technical features. Therefore, the features defined with "first" and "second" may explicitly or implicitly include one or more of the features. In the description of the present disclosure, "plurality" means two or more, unless otherwise specifically defined.

In the description of the present disclosure, it should be noted that, unless otherwise clearly specified and limited, the terms "installation," "interconnection," and "connection" should be understood in a broad sense. For example, it can be a fixed connection or a detachable connection or an integral connection, which can be mechanically connected, or can be electrically connected or can communicate with each other; can be directly connected or indirectly connected via an intermediate medium, wherein the connection can be internal communication of two components or interaction relationship of two components. For those ordinarily skilled in the art, the specific meanings of the above-mentioned terms in the present disclosure can be understood according to specific circumstances.

In the present disclosure, unless expressly stipulated and defined otherwise, a first feature "above" or "below" a second feature may include direct contact between the first and second features or may include that the first and second features are not in direct contact but via other features between them. Moreover, the first feature "above," "over," and "on top of" the second feature includes that the first feature directly above and obliquely above the second feature, or simply means that a level of the first feature is higher than that of the second feature. The first feature "below," "under," and "underneath" the second feature includes that the first feature directly below and obliquely below the second feature, or simply means that a level of the first feature is smaller than the second feature.

The following disclosure provides many different embodiments or examples for realizing different structures of the present disclosure. In order to simplify the disclosed contents of the present disclosure, the components and dispositions of specific examples are described below. Certainly, they are only examples and are not intended to limit the present disclosure. In addition, the present disclosure may repeat reference numerals and/or reference letters in different examples. Such repetition is used for a purpose of simplification and clarity and does not indicate the relationship between the various embodiments and/or configurations discussed. In addition, the present disclosure provides examples of various specific processes and materials, but those ordinarily skilled in the art may be aware of the application of other processes and/or the use of other materials.

Figure 2:
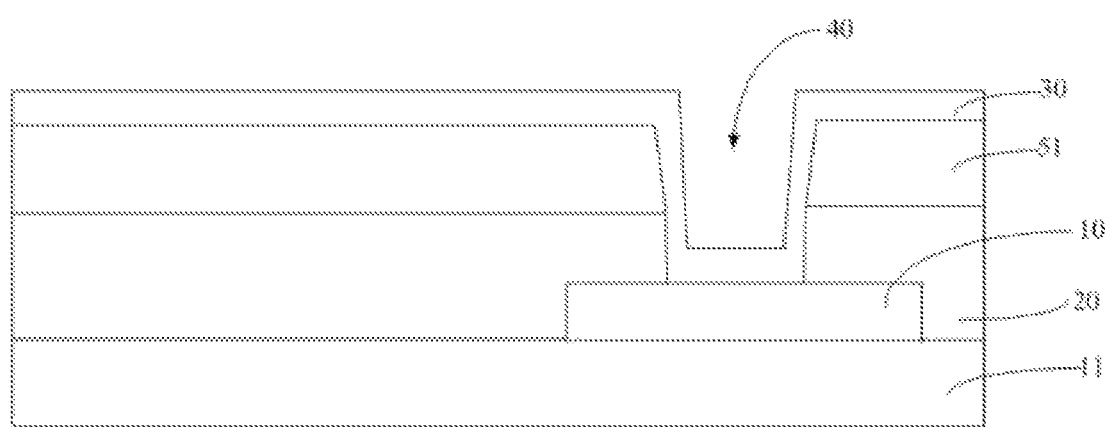
FIG. 2 is a schematic diagram of a cross-sectional structure of a shorting bar covered with a conductive layer provided by an embodiment of the present disclosure.
Figure 3:
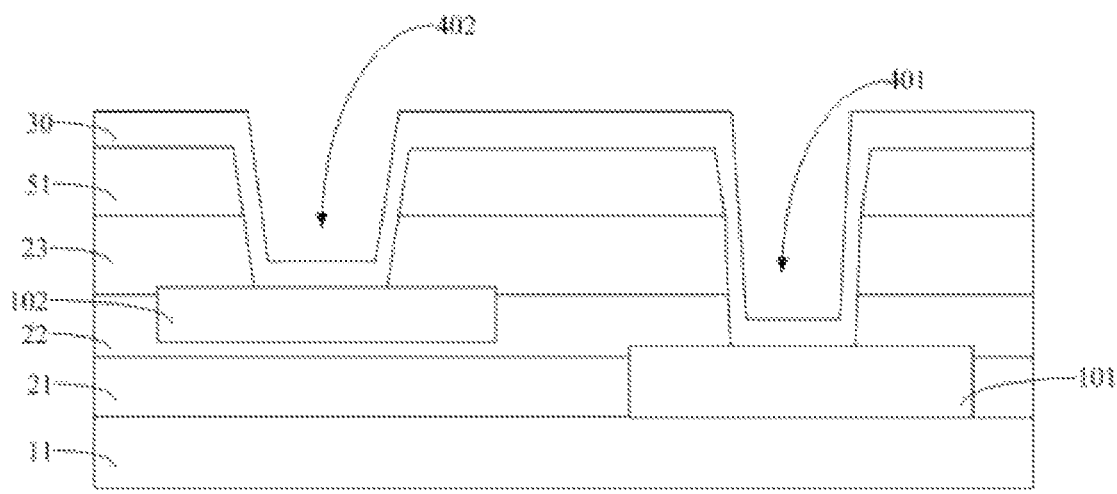
FIG. 3 is a schematic diagram of a cross-sectional structure of a shorting bar covered with a conductive layer providing by another embodiment of the present disclosure.

Please refer to FIGS. 1 to 3, an embodiment of the present disclosure provides a shorting bar that includes a plurality of test lines 100. The test lines 100 are disposed in a spaced manner, wherein each of the test lines 100 includes a base substrate 11, an insulation layer 20, one or more via holes 40, and a conductive layer 30.

Regarding the base substrate 11, that may be a glass substrate or a flexible substrate. Material of the base substrate 11 includes one or more of glass, silicon dioxide, polyethylene, polypropylene, polystyrene, polylactic acid, polyethylene terephthalate, polyimide, or polyurethane.

Regarding the insulation layer 20, one or more metal wires 10 are disposed in each of the test lines 100, each of the test lines 100 is formed with one or more via holes 40, and each of the metal wires 10 are at least partially exposed in one of the via holes 40.

Regarding the conductive layer 30, that is at least partially disposed in the via holes 40 and covers the exposed metal wires 10. The conductive layer 30 covers each of the metal wires 10 and extends to an inner wall of each of the via holes 40 and the insulation layer 20. The conductive layer 30 is a strippable conductive layer. The strippable conductive layer 30 may be indium tin oxide (ITO) film. Specifically, the strippable conductive layer 30 can be stripped off the insulation layer 20. The strippable conductive layer 30 is used to expose each of the metal wires 10 in one of the via holes 40 to be oxidized and increase resistance.

The shorting bar of the present disclosure is provided by providing one or more via holes 40 in the test lines 100, each of the metal wires 10 of the test lines 100 are exposed in one of the via holes 40, and the erasable conductive layer 30 is provided on the metal wires 10. The conductive layer 30 can prevent the metal wires 10 of the test lines 100 from being corroded by water vapor before a process of a cell test. Because the conductive layer 30 is the erasable conductive layer, after the cell test is completed, the conductive layer 30 can be directly erased to make that the metal wires 10 of the test lines 100 are exposed in the air through the via holes 40, so that the metal wires 10 are oxidized and corroded in the air, thereby increasing resistance of the metal wires 10, and causing static electricity to be released directly on the metal wires 10 of the test lines 100 to prevent static electricity injury, which helps to improve yield of the product.

It is understandable that, in some embodiments, the conductive layer 30 is a transparent conductive layer. The transparent conductive layer 30, in addition to being made of indium tin oxide, can also be made of antimony-doped tin oxide, aluminum-doped zinc oxide, or indium-doped zinc oxide.

In some embodiments, a thickness of the conductive layer 30 is ranged from 0.5 to 0.7 μm. Illustratively, the thickness of the conductive layer 30 may be 0.5 μm, and the thickness of the conductive layer 30 may also be 0.7 μm. By controlling the thickness of the conductive layer 30, that is, the thickness of the conductive layer 30 disposed to be relatively thin, which is beneficial to the subsequent erasing of the conductive layer 30. The conductive layer 30 can be stripped off the metal wires 10 by scraping or rubbing with alcohol.

In some embodiments, a size of each of the via holes 40 is ranged from 8 to 30 μm. For example, the size of the via holes 40 may be 8 μm, 15 μm, or 30 μm, etc. If the via holes 40 are formed in a larger form, areas of the metal wires 10 exposed in the air are larger, which is beneficial to increase the resistance of the metal wires 10.

In some embodiments, a number of the one or more via holes is a plurality, as shown in FIG. 1, the plurality of via holes 40 are disposed in a spaced manner, in a length direction of the test lines 100. A configuration of the plurality of via holes 40 is beneficial to increase the areas of the metal wires 10 exposed in the air, thereby facilitating to increase the resistance of the metal wires 10 later, so that static electricity can be released on the test lines 100, thereby improving antistatic ability of the test lines 100, which helps to improve the yield of products. It is understandable that each of via holes 40 can be shaped as at least one of a circle, a rectangle, or a triangle. The present embodiment is not specifically limited here.

In some embodiments, a distance between adjacent two of the plurality of via holes 40 is ranged from 5 to 10 μm, in a length direction of the test lines 40. Illustratively, the distance between adjacent two of the plurality of via holes 40 may be 5 μm, 8 μm, or 10 μm. When the size of each of the via holes 40 is constant, if the number of the via holes 40 is greater, the exposed metal material of the test lines 100 is increased after the conductive layer 30 is stripped. An oxidized area of each of the metal wires 10 is larger, and the resistance is greater, which is more conducive to anti-electro-static discharge (ESD).

Figure 4:
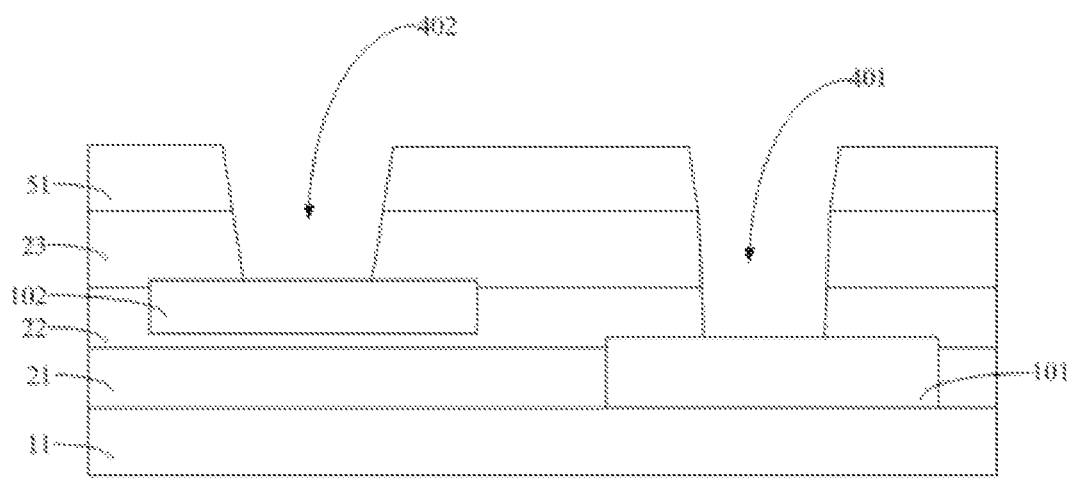
FIG. 4 is a schematic diagram of a cross-sectional structure of a shorting bar stripped off a conductive layer providing by an embodiment of the present disclosure.

In some embodiments, as shown in FIGS. 3 and 4, the one or more via holes 40 may include a first hole 401, the one or more metal wires 10 may include a first wire. The insulation layer 20 may include a first insulation layer 21. The test lines 100 further include a first metal layer 101 and a color resist layer 51. The first wire is arranged in the first metal layer 101.

The first insulation layer 21 is disposed on the base substrate 11. The first metal layer 101 is disposed in the first insulation layer 21. The color resist layer 51 is disposed over the first insulation layer 21. The first hole 401 is formed in the color resist layer 51 and above the first insulation layer 21. The conductive layer 30 is disposed on the color resist layer 51. The conductive layer 30 is also disposed on the first metal layer 101 through the first hole 401. The function of the first hole 401 is used to remove material of the color resist layer 51 and each insulation layer over the first metal layer 101 and the second metal layer 102, so that the first metal layer 101 (e.g., the first wire) is exposed in the first hole 401. In addition, the color resist layer 51 includes a plurality of color resists, such as red color resists, green color resists, and blue color resists.

In some embodiments, the one or more via holes 40 may also include a second hole 402, each of the metal wires 10 may also include a second wire, the insulation layer 20 may include a second insulation layer 22, and the test lines 100 also includes a second metal layer 102.

The second insulation layer 22 is disposed between the first metal layer 101 and the color resist layer 51. Specifically, the color resist layer 51 is disposed above the second insulation layer 22;

The second metal layer 102 is disposed in the second insulation layer 22. The second wire is disposed in the second metal layer 102.

The first metal layer 101, the second metal layer 102, and the color resist layer 51 are made of conductive materials and are insulated from each other. Specifically, as shown in FIG. 3, the first insulation layer 21 is provided between the base substrate 11 and the first metal layer 101, and the second insulation layer 22 is provided between the first metal layer 101 and the second metal layer 102. The second metal layer 102 is disposed in the second insulation layer 22. A third insulation layer 23 is further disposed between the second metal layer 102 and the color resist layer 51.

The second hole 402 is defined in the color resist layer 51 and above the second insulation layer 22. The function of the second hole 402 is used to remove the material of the color resist layer 51 and each insulation layer over the metal material, so that the second metal layer 102 (e.g., the second wire) is exposed in the second hole 402.

The conductive layer 30 covers the color resist layer 51. The conductive layer 30 is disposed on the exposed second metal layer 102 through the second hole 402. The first metal layer 101 and the second metal layer 102 are connected via the conductive layer 30. Specifically, the conductive layer 30 covers an inner wall of the second hole 402.

In the present embodiment, the one or more via holes 40 may include a first hole 401 and a second hole 402, the metal wire 10 may also include a first wire and a second wire, the first wire and the second wire are respectively exposed in the first hole 401 and the second hole 402, the conductive layer 30 covers the color resist layer 51, an inner wall of the first hole 401, and an inner wall of the second hole 402. With such configuration, the first wire and the second wire can be electrically connected via the conductive layer 30. By arranging the first wire and the second wire in different layers and using the conductive layer 30 to cover for the protection, the resistance of the metal wires 10 is reduced, which is beneficial to the display of the panel. After the conductive layer 30 is stripped off, the first wire and the second wire are exposed in the air to cause oxidation of the metal material, thereby increasing the resistance, which is beneficial to the anti-static discharge ability and improving the yield of the products.

Illustratively, the first metal layer 101 and the second metal layer 102 may be made of one or more metals of molybdenum, chromium, aluminum, or copper. Illustratively, the first metal layer 101 can be made of a single layer of copper, and the first metal layer 101 can also be made of a molybdenum/aluminum or a molybdenum/aluminum/molybdenum multi-layer stacked structure.

In some embodiments, as shown in FIG. 1, the shorting bar further includes a test pad 200. The test pad is connected to the plurality of test lines 100. Illustratively, the test pad 200 includes a plurality of test sub-pads 201. The test sub-pads 201 are disposed in a spaced manner The number of the test sub-pads 201 is 4, which are respectively a red-pixel-color test pad, a green-pixel-color test pad, a blue-pixel-color test pad, and an upper-plate-common-electrode test pad. In addition, two sides of the test sub-pads 201 are connected to data lines via the test lines 100. The red-pixel-color test pad is connected to a part of the data lines corresponding to red pixels via a part of the test lines 100. The green-pixel-color test pad is connected to a part of the data lines corresponding to green pixels via a part of the test lines 100. The blue-pixel-color test pad is connected to a part of the data lines corresponding to blue pixels via a part of the test lines 100. The upper-plate-common-electrode test pad is connected to upper plate common electrodes of a color-film substrate corresponding to red, green, and blue pixels via a part of the test lines 100.

In order to implement the shorting bar of the present disclosure better, the embodiment of the present disclosure also provides a display panel, which includes the shorting bar. Illustratively, the display panel may be a liquid crystal display panel. Because the display panel has the shorting bar, it has all the same beneficial effects of the present disclosure, which will not be repeatedly described here.

Specifically, the display panel includes a display region and a non-display region adjacent to the display region. The non-display region is provided with wiring, and the display region is provided with a plurality of data lines and a plurality of scan lines, and the wiring includes wiring connecting to the data lines and scan lines. The shorting bar includes a plurality of test lines 100. When the test lines 100 are applied to the display panel, they are generally made in the non-display region of the display panel and connected to the wiring in the display panel via the data lines and scan lines in the display region of the display panel. By connecting the wiring to the shorting bar, signals can be inputted to the test pads 200 of the shorting bar by a screen tester, the display panel can be performed a process of a screen test. After the screen test is completed, the display panel that passes the screen test is only required to cut off connection parts between the signal lines and the wiring of the display panel with a laser, so that the display panel can be used for the next step of assembling a drive circuit module.

An embodiment of the present disclosure also provides a display device, which includes the display panel. Because the display device has the above display panel, it has all the same beneficial effects of the present disclosure, which will not be repeatedly described here. The embodiments of the present disclosure are not imposed specific restrictions on applications of the display device, which can be any product or component with a display function, such as televisions, laptops, tablet computers, wearable display devices (such as smart-bracelets and smart-watches), mobile phones, virtual reality devices, augmented reality devices, vehicle display, and advertising light box.

In the above embodiments, the description of each embodiment has its own focus. For parts that are not described in detail in an embodiment, reference may be made to related descriptions of other embodiments.

The above describes in detail a shorting bar, a display panel, and a display device provided in the embodiments of the present disclosure. Herein, specific examples are used to illustrate the principles and implementations of the present disclosure. The description of the above embodiments is only to help understand the technical solutions of the present disclosure and its core ideas. Those ordinarily skilled in the art should understand that they can still modify the technical solutions described in the foregoing embodiments, or equivalently replace some of the technical features. In addition, these modifications or replacements do not cause the essence of the corresponding technical solutions to deviate from the scope of the technical solutions of the embodiments of the present disclosure.

What is claimed is:

1. A shorting bar, comprising a plurality of test lines, wherein each of the test lines comprises:
   a base substrate;
   an insulation layer disposed on the base substrate, wherein one or more via holes are defined in the insulation layer;
   one or more metal wires disposed in the insulation layer, wherein each of the metal wires are at least partially exposed in one of the via holes;

a conductive layer at least partially disposed in the via holes and covering the exposed metal wires, wherein the conductive layer is a strippable conductive layer; and a test pad connected to the test lines, wherein the test pad comprises a plurality of test sub-pads that are disposed in a spaced manner.

2. The shorting bar as claimed in claim 1, wherein a thickness of the conductive layer is ranged from 0.5 to 0.7 µm.

3. The shorting bar as claimed in claim 1, wherein a size of each of the via holes is ranged from 8 to 30 µm.

4. The shorting bar as claimed in claim 1, wherein a number of the one or more via holes is a plurality, and the plurality of via holes are disposed in a spaced manner.

5. The shorting bar as claimed in claim 4, wherein a distance between adjacent two of the plurality of via holes is ranged from 5 to 10 µm, in a length direction of the test lines.

6. The shorting bar as claimed in claim 4, wherein each of the plurality of via holes is shaped as at least one of a circle, a rectangle, or a triangle.

7. The shorting bar as claimed in claim 1, wherein the conductive layer is a transparent conductive layer made of indium tin oxide, antimony-doped tin oxide, aluminum-doped zinc oxide, or indium-doped zinc oxide production.

8. The shorting bar as claimed in claim 1, wherein the one or more via holes comprise a first hole, the one or more metal wires comprise a first metal layer, the insulation layer comprises a first insulation layer, wherein the first insulation layer is disposed on the base substrate, and the first metal layer is disposed in the first insulation layer.

9. The shorting bar as claimed in claim 8, further comprising:

a color resist layer disposed above the first metal layer, wherein the first hole is defined in the color resist layer and above the first insulation layer, and the first metal layer is at least partially exposed in the first hole; and the conductive layer is disposed on the exposed first metal layer.

10. The shorting bar as claimed in claim 9, wherein the color resist layer comprises a plurality of color resists with different colors.

11. The shorting bar as claimed in claim 8, wherein the first metal layer is made of one or more metals of molybdenum, chromium, aluminum, or copper.

12. The shorting bar as claimed in claim 9, wherein the one or more via holes further comprise a second hole, the insulation layer comprises a second insulation layer, and the shorting bar further comprises a second metal layer;

the second insulation layer is disposed between the first metal layer and the color resist layer;

the second metal layer is disposed in the second insulation layer;

the second hole is defined in the color resist layer and above the second insulation layer, and the second metal layer is at least partially exposed in the second hole; and the conductive layer covers the color resist layer, and the first metal layer and the second metal layer are connected via the conductive layer.

13. The shorting bar as claimed in claim 12, wherein the second metal layer is made of one or more metals of molybdenum, chromium, aluminum, or copper.

14. The shorting bar as claimed in claim 1, wherein material of the base substrate comprises one or more of glass, silicon dioxide, polyethylene, polypropylene, polystyrene, polylactic acid, polyethylene terephthalate, polyimide, or polyurethane.

15. The shorting bar as claimed in claim 1, wherein the test sub-pads comprise a red-pixel-color test pad, a green-pixel-color test pad, a blue-pixel-color test pad, and an upper-plate-common-electrode test pad, and two sides of the test sub-pads are connected to the data lines via the test lines.

16. A display panel, comprising the shorting bar as claimed in claim 1.

17. The display panel as claimed in claim 16, wherein a thickness of the conductive layer is ranged from 0.5 to 0.7 µm.

18. The display panel as claimed in claim 16, wherein a size of each of the via holes is ranged from 8 to 30 µm The display panel as claimed in claim 16, wherein a size of each of the via holes is ranged from 8 to 30 µm.

19. A display device comprising the display panel as claimed in claim 16.

* * * * *